US008527655B2

(12) United States Patent  (10) Patent No.: US 8,527,655 B2
Morris et al.  (45) Date of Patent: Sep. 3, 2013

(54) OPTIMAL ROUTING OF AUDIO, VIDEO, AND CONTROL DATA THROUGH HETEROGENEOUS NETWORKS

(75) Inventors: Stephen Jeffrey Morris, Harvard, MA (US); David Emmanuel Bartolini, Charlton, MA (US); Jason John Perreault, Northborough, MA (US); Richard Casey Clarkson, Westborough, MA (US); Victoria Diane Staubly, Manassas, VA (US)

(73) Assignee: VIDSYS, Inc., Vienna, VA (US)

( * ) Notice: Subject to any disclaimer, the term of this patent is extended or adjusted under 35 U.S.C. 154(b) by 1276 days.

(21) Appl. No.: 12/125,134

(22) Filed: May 22, 2008

(65) Prior Publication Data

US 2012/0179835 A1  Jul. 12, 2012

Related U.S. Application Data

(60) Provisional application No. 60/939,517, filed on May 22, 2007, provisional application No. 60/939,503, filed on May 22, 2007, provisional application No. 60/939,521, filed on May 22, 2007, provisional application No. 60/939,528, filed on May 22, 2007.

(51) Int. Cl.
    *G06F 15/173* (2006.01)
(52) U.S. Cl.
    USPC ............ 709/238; 709/203; 370/238; 370/338
(58) Field of Classification Search
    USPC .......................................................... 709/238
    See application file for complete search history.

(56) References Cited

U.S. PATENT DOCUMENTS

| 5,517,547 | A  | * | 5/1996  | Ladha et al. ................... 379/40 |
| 6,088,333 | A  |   | 7/2000  | Yang et al. |
| 6,304,549 | B1 |   | 10/2001 | Srinivasan et al. |
| 6,314,204 | B1 |   | 11/2001 | Cham et al. |
| 6,553,515 | B1 | * | 4/2003  | Gross et al. .................. 714/47.2 |
| 6,556,960 | B1 |   | 4/2003  | Bishop et al. |
| 6,970,942 | B1 |   | 11/2005 | King et al. |
| 2003/0220906 | A1 |   | 11/2003 | Chickering |
| 2004/0199664 | A1 | * | 10/2004 | Feldman et al. ............. 709/238 |
| 2007/0248065 | A1 | * | 10/2007 | Banerjea et al. ............. 370/338 |
| 2008/0126579 | A1 | * | 5/2008  | Corneli et al. .................. 710/5 |
| 2008/0144726 | A1 | * | 6/2008  | Ingber et al. ............. 375/240.28 |

OTHER PUBLICATIONS

International Search Report and Written Opinion mailed Apr. 23, 2009 in corresponding International Application No. PCT/US2008/064587.

* cited by examiner

*Primary Examiner* — Hua Fan
(74) *Attorney, Agent, or Firm* — Chapin IP Law, LLC

(57) ABSTRACT

Effecting the transmission of video data across a network of resources that includes incompatible resources is disclosed. Information indicating a source device and a destination device is received. The source device originates the video data and the destination device is to receive the video data. A plurality of paths between the source device and the destination device is identified. Each path is defined by a set of resources, the set of resources including resources needed to transmit the video data across any incompatible resources in the path. From the plurality of paths, a best path for transmission of the video data is determined based on the set of resources for that path, a distance between the source device and the destination device along that path, and a quality of the video data maintained by that path. The transmission of the video data is then effected across the determined best path.

27 Claims, 6 Drawing Sheets

401 RECEIVE INFORMATION INDICATING A SOURCE DEVICE AND A DESTINATION DEVICE, THE SOURCE DEVICE ORIGINATING THE VIDEO DATA AND CORRESPONDING AUDIO DATA, AND THE DESTINATION DEVICE TO RECEIVE THE VIDEO DATA AND THE AUDIO DATA

402 IDENTIFY A PLURALITY OF PATHS BETWEEN THE SOURCE DEVICE AND THE DESTINATION DEVICE, EACH PATH DEFINED BY A SET OF RESOURCES, THE SET OF RESOURCES INCLUDING RESOURCES NEEDED TO TRANSMIT THE VIDEO DATA AND THE AUDIO DATA ACROSS ANY INCOMPATIBLE RESOURCES IN THE PATH

405 IDENTIFY A PLURALITY OF PATHS BETWEEN THE SOURCE DEVICE AND THE DESTINATION DEVICE, EACH PATH DEFINED BY A SET OF RESOURCES, THE SET OF RESOURCES INCLUDING RESOURCES NEEDED TO TRANSMIT THE VIDEO DATA AND THE AUDIO DATA ACROSS ANY INCOMPATIBLE RESOURCES IN THE PATH, WHEREIN AT LEAST ONE PATH DIVERGES INTO TWO BRANCHES FOR AT LEAST ONE HOP IN THE PATH DUE TO AT LEAST ONE RESOURCE THAT IS NOT CAPABLE OF TRANSMITTING BOTH THE VIDEO DATA AND THE AUDIO DATA

403 DETERMINE, FROM THE PLURALITY OF PATHS, A BEST PATH FOR TRANSMISSION OF THE VIDEO DATA AND THE AUDIO DATA, BASED ON THE SET OF RESOURCES FOR THAT PATH, A DISTANCE BETWEEN THE SOURCE DEVICE AND THE DESTINATION DEVICE ALON THAT PATH, AND A QUALITY OF THE VIDEO DATA AND THE AUDIO DATA MAINTAINED BY THAT PATH

404 EFFECT THE TRANSMISSION OF THE VIDEO DATA AND THE AUDIO DATA ACROSS THE DETERMINED BEST PATH

FIG. 4

501 RECEIVE INFORMATION INDICATING A SOURCE DEVICE AND A DESTINATION DEVICE, THE SOURCE DEVICE ORIGINATING THE VIDEO DATA AND THE DESTINATION DEVICE TO RECEIVE THE VIDEO DATA

502 IDENTIFY A PLURALITY OF PATHS BETWEEN THE SOURCE DEVICE AND THE DESTINATION DEVICE, EACH PATH DEFINED BY A SET OF RESOURCES, THE SET OF RESOURCES INCLUDING RESOURCES NEEDED TO TRANSMIT THE VIDEO DATA ACROSS ANY INCOMPATIBLE RESOURCES IN THE PATH

503 DETERMINE, FROM THE PLURALITY OF PATHS, A BEST PATH FOR TRANSMISSION OF THE VIDEO DATA, BASED ON THE SET OF RESOURCES FOR THAT PATH, A DISTANCE BETWEEN THE SOURCE DEVICE AND THE DESTINATION DEVICE ALONG THAT PATH, AND A QUALITY OF THE VIDEO DATA MAINTAINED BY THAT PATH

504 EFFECT THE TRANSMISSION OF THE VIDEO DATA ACROSS THE DETERMINED BEST PATH

505 IDENTIFY A PLURALITY OF CONTROL PATHS BETWEEN THE DESTINATION DEVICE AND THE SOURCE DEVICE ACROSS THE NETWORK, EACH CONTROL PATH CAPABLE OF CARRYING CONTROL DATA FROM THE DESTINATION DEVICE TO THE SOURCE DEVICE, EACH CONTROL PATH DEFINED BY A SET OF RESOURCES, THE SET OF RESOURCES INCLUDING RESOURCES NEEDED TO TRANSMIT THE CONTROL DATA ACROSS ANY INCOMPATIBLE RESOURCES IN THE CONTROL PATH

508 THE VIDEO DATA ORIGINATES AT A FIRST SOURCE DEVICE AND TRAVELS THROUGH A SECOND SOURCE DEVICE TO THE DESTINATION DEVICE VIA THE DETERMINED BEST PATH: IDENTIFY A PLURALITY OF CONTROL PATHS BETWEEN THE DESTINATION DEVICE AND THE FIRST AND SECOND SOURCE DEVICES, EACH CONTROL PATH DIVERGING AT A POINT SO AS TO CARRY CONTROL DATA FROM THE DESTINATION DEVICE TO THE FIRST SOURCE DEVICE AND TO THE SECOND SOURCE DEVICE, EACH CONTROL PATH DEFINED BY A SET OF RESOURCES, THE SET OF RESOURCES INCLUDING RESOURCES NEEDED TO TRANSMIT THE CONTROL DATA ACROSS ANY INCOMPATIBLE RESOURCES IN THE CONTROL PATH

506 DETERMINE, FROM THE PLURALITY OF CONTROL PATHS, A BEST CONTROL PATH FOR TRANSMISSION OF THE CONTROL DATA, BASED ON THE SET OF RESOURCES FOR THAT CONTROL PATH, A DISTANCE BETWEEN THE DESTINATION DEVICE AND THE SOURCE DEVICE ALONG THAT CONTROL PATH, AND A QUALITY OF THE CONTROL DATA MAINTAINED BY THAT CONTROL PATH

507 EFFECT THE TRANSMISSION OF THE CONTROL DATA ACROSS THE DETERMINED BEST CONTROL PATH

FIG. 5

601 RECEIVE INFORMATION INDICATING A SOURCE DEVICE AND A DESTINATION DEVICE, THE SOURCE DEVICE ORIGINATING THE VIDEO DATA AND CORRESPONDING AUDIO DATA AND TO RECEIVE CONTROL DATA, AND THE DESTINATION DEVICE TO RECEIVE THE VIDEO DATA AND THE AUDIO DATA AND ORIGINATING THE CONTROL DATA

602 IDENTIFY A PLURALITY OF PATHS BETWEEN THE SOURCE DEVICE AND THE DESTINATION DEVICE, THE PLURALITY OF PATHS DIVIDED INTO A FIRST GROUP AND A SECOND GROUP, THE FIRST GROUP CAPABLE OF TRANSMITTING AUDIO DATA, VIDEO DATA, OR BOTH, WHEREIN EACH PATH IN THE FIRST GROUP IS DEFINED BY A SET OF RESOURCES, THE SET OF RESOURCES INCLUDING RESOURCES NEEDED TO TRANSMIT THE VIDEO DATA AND THE AUDIO DATA ACROSS ANY INCOMPATIBLE RESOURCES IN THE PATH, THE SECOND GROUP CAPABLE OF TRANSMITTING CONTROL DATA, WHEREIN EACH PATH IN THE SECOND GROUP IS DEFINED BY A SET OF RESOURCES, THE SET OF RESOURCES INCLUDING RESOURCES NEEDED TO TRANSMIT THE CONTROL DATA ACROSS ANY INCOMPATIBLE RESOURCES IN THE PATH

603 DETERMINE, FROM THE FIRST GROUP, A FIRST BEST PATH FOR TRANSMISSION OF THE VIDEO DATA AND THE AUDIO DATA, BASED ON THE SET OF RESOURCES FOR THAT PATH, A DISTANCE BETWEEN THE SOURCE DEVICE AND THE DESTINATION DEVICE ALONG THAT PATH, AND A QUALITY OF THE VIDEO DATA AND THE AUDIO DATA MAINTAINED BY THAT PATH

604 DETERMINE, FROM THE SECOND GROUP, A SECOND BEST PATH FOR TRANSMISSION OF THE CONTROL DATA, BASED ON THE SET OF RESOURCES FOR THAT PATH, A DISTANCE BETWEEN THE DESTINATION DEVICE AND THE SOURCE DEVICE ALONG THAT PATH, AND A QUALITY OF THE CONTROL DATA MAINTAINED BY THAT PATH

605 EFFECT THE TRANSMISSION OF THE VIDEO DATA AND THE AUDIO DATA ACROSS THE DETERMINED FIRST BEST PATH

606 EFFECT THE TRANSMISSION OF THE CONTROL DATA ACROSS THE DETERMINED SECOND BEST PATH

FIG. 6

OPTIMAL ROUTING OF AUDIO, VIDEO, AND CONTROL DATA THROUGH HETEROGENEOUS NETWORKS

PRIORITY TO EARLIER FILED PROVISIONAL PATENT APPLICATIONS

This application claims the benefit of the filing date of the following earlier filed co-pending U.S. Provisional patent applications: Ser. No. 60/939,517, entitled "METHOD AND APPARATUS FOR EVENT CAPTURE, CROSS DEVICE EVENT CORRELATION, AND RESPONSIVE ACTIONS", filed on May 22, 2007; Ser. No. 60/939,503, entitled "METHOD AND APPARATUS FOR TRACKING PEOPLE AND OBJECTS USING MULTIPLE LIVE AND RECORDED SURVEILLANCE CAMERA VIDEO FEEDS", also filed on May 22, 2007; Ser. No. 60/939,521 entitled "METHOD AND APPARATUS FOR INTELLIGENT VIDEO TOURS", also filed on May 22, 2007; and Ser. No. 60/939,528, entitled "METHOD AND APPARATUS FOR OPTIMAL ROUTING OF AUDIO & VIDEO SIGNALS THROUGH HETEROGENEOUS NETWORKS", also filed on May 22, 2007. These all share co-inventorship with the present application. The entire teachings and contents of these Provisional patent applications are hereby incorporated by reference herein in their entirety.

BACKGROUND

Securing an area from threats, both internal to the facility and external to it, has long been a desire of those who have something of value that may be desirable to others located within the area. Early conventional security mechanisms involved placing guards at points of entry to an area to be secured. Locks of differing strengths may also have been deployed on points of entry to the area, if the area was surrounded by walls or gates. With increasing sophistication in technology, guards were also deployed within areas (i.e., inside buildings) to patrol, and badge readers and other electronic entry devices were used to supplement locks.

Guards, however, are expensive to pay, and also capable of error. Particularly for larger facilities/facilities with many possible points of entry, it may not be possible to hire enough guards to "watch" everything going on. Thus, automated devices such as security cameras have also been added to the mix of security measures. The addition of security cameras meant that security personnel could "see" all of the interesting areas of the facility (i.e., points of entry, locations were things of valued were stored, etc.). However, an increase in the number of cameras placed into a facility made it harder to watch all of the cameras simultaneously without hiring more personnel to watch the cameras. Doing so would remove the primary monetary advantage of using cameras, that is, not having to employ more personnel.

One conventional solution to the "too many cameras" problem is for security personnel to pay particular attention to a subset of all the available cameras. In this scenario, the question becomes which cameras to watch, and which cameras to ignore. Typically, the areas of high value and high risk (e.g., a vault, primary entry and exit points such as the doors going in/out of a building, etc.) are given primary focus, and other areas of lesser value and/or risk are given secondary focus. These measures have served as an adequate defense against "low tech" threats (i.e., breaking and entering by common criminals).

SUMMARY

Conventional security mechanisms such as those explained above suffer from a variety of deficiencies. In almost any security environment, but particularly in large scale security operations, there are a large number of different devices, all of different types, all with their own particular protocols and communication requirements, that must interact with each other in order to enable a security system. Further, some components may operate in only an analog domain, while other components operate in only a digital domain, and still other components operate in both domains. Convention mechanisms for connecting such disparate devices across a network essentially involve acquiring a large number of cables and connecting as many different possible scenarios as possible. Cross-device and/or cross-domain communication, without connected cables and appropriate transformation elements hardwired therein, are simply not possible.

Embodiments disclosed herein significantly improve upon the conventional mechanisms by providing for dynamic routing of security-related data (i.e., video data, audio data, and/or control data) over a network of disparate resources, some of which may be incompatible with others. A source device and a destination device are identified, and embodiments find all possible paths over the network between those devices, including those paths that may have incompatible resources. That is, a camera made by one manufacturer may be unable to talk a network video recorder (NVR) made by a different manufacturer, and so on. Alternatively, an analog audio signal from a microphone may not be an acceptable input to a digital routing device. In any case, embodiments recognize when other resources, such as transformational elements (A/D or D/A converters, for example), are needed, and take these into account as well. Embodiments also identify various characteristics about each possible path—how many hops in the path, what happens to signals as they travel over the path, and the like. Using this information, as well as perhaps further information, embodiments determine which possible path is likely to be the best path, that is, the most optimal for effecting the transmission of the data. Upon determining this best path, the appropriate data is sent over it from the source device to the destination device (or vice versa), allowing users to view video and/or audio data and provide control data to devices.

More particularly, in an embodiment, there is provided a method of effecting the transmission of video data across a network of resources, the network including incompatible resources. The method includes receiving information indicating a source device and a destination device, the source device originating the video data and the destination device to receive the video data, and identifying a plurality of paths between the source device and the destination device, each path defined by a set of resources, the set of resources including resources needed to transmit the video data across any incompatible resources in the path. The method also includes determining, from the plurality of paths, a best path for transmission of the video data, based on the set of resources for that path, a distance between the source device and the destination device along that path, and a quality of the video data maintained by that path, and effecting the transmission of the video data across the determined best path.

In a related embodiment, receiving may include receiving information indicating a source device and a destination device, the source device originating the video data and corresponding audio data, and the destination device to receive the video data and the audio data; and identifying may include identifying a plurality of paths between the source device and the destination device, each path defined by a set of resources, the set of resources including resources needed to transmit the video data and the audio data across any incompatible resources in the path; and determining may include determining, from the plurality of paths, a best path for transmission of the video data and the audio data, based on the set of resources for that path, a distance between the source device and the destination device along that path, and a quality of the video data and the audio data maintained by that path; and effecting may include effecting the transmission of the video data and the audio data across the determined best path.

In a further related embodiment, identifying may include identifying a plurality of paths between the source device and the destination device, each path defined by a set of resources, the set of resources including resources needed to transmit the video data and the audio data across any incompatible resources in the path, wherein at least one path diverges into two branches for at least one hop in the path due to at least one resource that is not capable of transmitting both the video data and the audio data.

In another related embodiment, the method may include identifying a plurality of control paths between the destination device and the source device across the network, each control path capable of carrying control data from the destination device to the source device, each control path defined by a set of resources, the set of resources including resources needed to transmit the control data across any incompatible resources in the control path; determining, from the plurality of control paths, a best control path for transmission of the control data, based on the set of resources for that control path, a distance between the destination device and the source device along that control path, and a quality of the control data maintained by that control path; and effecting the transmission of the control data across the determined best control path.

In a further related embodiment, the video data may originate at a first source device and travel through a second source device to the destination device via the determined best path, and identifying a plurality of control paths may include identifying a plurality of control paths between the destination device and the first and second source devices, each control path diverging at a point so as to carry control data from the destination device to the first source device and to the second source device, each control path defined by a set of resources, the set of resources including resources needed to transmit the control data across any incompatible resources in the control path.

In yet another related embodiment, receiving may include receiving information indicating a source device and a destination device, the source device originating the video data and corresponding audio data and to receive control data, and the destination device to receive the video data and the audio data and originating the control data; and identifying may include identifying a plurality of paths between the source device and the destination device, the plurality of paths divided into a first group and a second group, the first group capable of transmitting audio data, video data, or both, wherein each path in the first group is defined by a set of resources, the set of resources including resources needed to transmit the video data and the audio data across any incompatible resources in the path, the second group capable of transmitting control data, wherein each path in the second group is defined by a set of resources, the set of resources including resources needed to transmit the control data across any incompatible resources in the path; and determining may include determining, from the first group, a first best path for transmission of the video data and the audio data, based on the set of resources for that path, a distance between the source device and the destination device along that path, and a quality of the video data and the audio data maintained by that path; and determining, from the second group, a second best path for transmission of the control data, based on the set of resources for that path, a distance between the destination device and the source device along that path, and a quality of the control data maintained by that path; and effecting may include effecting the transmission of the video data and the audio data across the determined first best path; and effecting the transmission of the control data across the determined second best path.

In still yet another related embodiment, the method may include, prior to determining, obtaining status information on the set of resources for each path in the plurality of paths, the status information indicating an availability status for each resource in the set, the status information based in part on received event data pertaining to the resource.

In another embodiment, there is provided a computer program product, stored on computer readable medium, for effecting the transmission of video data across a network of resources, the network including incompatible resources. The computer program product includes computer program code for receiving information indicating a source device and a destination device, the source device originating the video data and the destination device to receive the video data; computer program code for identifying a plurality of paths between the source device and the destination device, each path defined by a set of resources, the set of resources including resources needed to transmit the video data across any incompatible resources in the path; computer program code for determining, from the plurality of paths, a best path for transmission of the video data, based on the set of resources for that path, a distance between the source device and the destination device along that path, and a quality of the video data maintained by that path; and computer program code for effecting the transmission of the video data across the determined best path.

In another embodiment, there is provided a computer system. The computer system includes a memory; a processor; a network interface; and an interconnection mechanism coupling the memory, the processor, and the network interface, allowing communication there between. The computer system is coupled to a network of resources through the network interface, the network including incompatible resources. The memory of the computer system is encoded with a dynamic route determination application, that when executed in the processor, provides a dynamic route determination process that effects the transmission of video data across the network of resources, by causing the computer system to perform operations of: receiving information indicating a source device and a destination device, the source device originating the video data and the destination device to receive the video data; identifying a plurality of paths between the source device and the destination device, each path defined by a set of resources, the set of resources including resources needed to transmit the video data across any incompatible resources in the path; determining, from the plurality of paths, a best path for transmission of the video data, based on the set of resources for that path, a distance between the source device and the destination device along that path, and a quality of the video data maintained by that path; and effecting the transmission of the video data across the determined best path.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as but not limited to an optical medium (e.g., CD-ROM, DVD-ROM, etc.), floppy or hard disk, a so-called "flash" (i.e., solid state) memory medium, or other physical medium, such as but not limited to firmware or microcode in one or more ROM or RAM or PROM chips, or as an Application Specific Integrated Circuit (ASIC), or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes may run on a small set of dedicated computers, or on one computer alone.

It is to be understood that embodiments of the invention may be embodied strictly as a software program, as software and hardware, or as hardware and/or circuitry alone. The features disclosed and explained herein may be employed in computerized devices and software systems for such devices such as those manufactured by Vidsys, Inc. of Marlborough, Mass.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 illustrates a flowchart of a procedure performed by the system of FIG. 1 when effecting the transmission of video data and audio data across incompatible resources in a network.

FIG. 5 illustrates a flowchart of a procedure performed by the system of FIG. 1 when effecting the transmission of video data across incompatible resources in a network, and effecting the transmission of control data along a reverse path.

FIG. 6 illustrates a flowchart of a procedure performed by the system of FIG. 1 when effecting the transmission of video data and audio data across incompatible resources in a network, and effecting the transmission of control data along a reverse path.

DETAILED DESCRIPTION

Generally, disclosed embodiments provide methods and apparatus for determining a best path in a network over which video data, audio data, and/or control data may travel, wherein the network includes incompatible resources. Embodiments identify a plurality of potentially usable paths, and characteristics about those paths. A best path is then determined by, for example, balancing a number of considerations related to the characteristics of a path, and transmission of the data is effective over the determined best path.

Disclosed embodiments may provide a network backbone structure on which applications such as a virtual tracking application, a dynamic touring application, and an event and rules correlation application all may execute. Such applications are described in related co-pending U.S. patent application Ser. No. 12/125,115, entitled "EVENT CAPTURE, CROSS DEVICE EVENT CORRELATION, AND RESPONSIVE ACTIONS", U.S. patent application Ser. No. 12/125,122, entitled "TRACKING PEOPLE AND OBJECTS USING MULTIPLE LIVE AND RECORDED SURVEILLANCE CAMERA VIDEO FEEDS", and U.S. patent application Ser. No. 12/125,124, entitled "INTELLIGENT VIDEO TOURS"; the entirety of these applications are hereby incorporated by reference.

Figure 1:
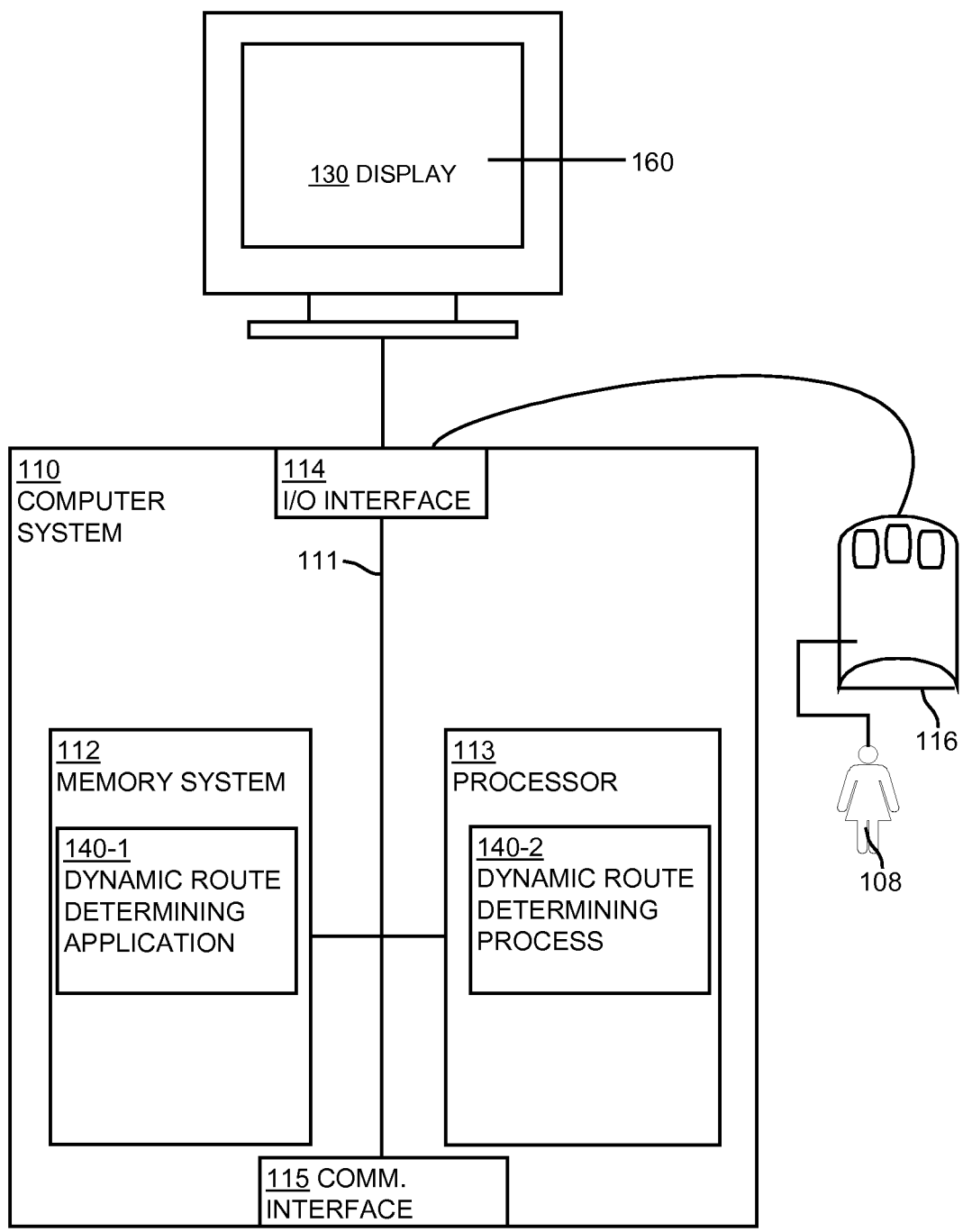
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a dynamic route determining application 140-1 and a dynamic route determining process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 to provide input commands and, if needed, view information on an option display device 130. The communications interface 115 enables the computer system 110 to communicate with other devices (e.g., other computers) on a network (not shown in FIG. 1).

The memory system 112 is any type of computer readable medium and in this example is encoded with a dynamic route determining application 140-1. The dynamic route determining application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the dynamic route determining application 140-1. Execution of the dynamic route determining application 140-1 in this manner produces processing functionality in a dynamic route determining process 140-2. In other words, the dynamic route determining process 140-2 represents one or more portions or runtime instances of the dynamic route determining application 140-1 performing or executing within or upon the processor 113 in the computer system 110 at runtime.

It is noted that example configurations disclosed herein include the dynamic route determining application 140-1 itself including the dynamic route determining process 140-2 (i.e., in the form of un-executed or non-performing logic instructions and/or data). The dynamic route determining application 140-1 may be stored on a computer readable medium (such as a floppy disk), hard disk, electronic, magnetic, optical or other computer readable medium. The dynamic route determining application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the dynamic route determining application 140-1 in the processor 113 as the dynamic route determining process 140-2. Those skilled in the art will understand that the computer system 110 may include other processes and/or software and hardware components, such as an operating system not shown in this example.

In some embodiments, the dynamic route determining process 140-2 may be distributed across a plurality of computer systems, including the computer system 110. For example, a police department computer system might have access, via a network, to a network of video devices located in a local school building. Of course, security personnel within the building will also have access to the same video devices, via their own computer system. The dynamic route determining process 140-2 may operate on the network within the school building, so that internal security personnel may view video and control devices. The dynamic route determining process 140-2 may also operate on the network connecting the police department with the network within the school building, to allow police department personnel to view video and control devices. In such a situation, the dynamic route determining process 140-2 may be said to be distributed across both the internal school building network, and the network connecting the police department computer system with the internal school building network. Of course, the dynamic route determining process 140-2 may be distributed across any number of computer systems and/or network as needed.

Figure 2:
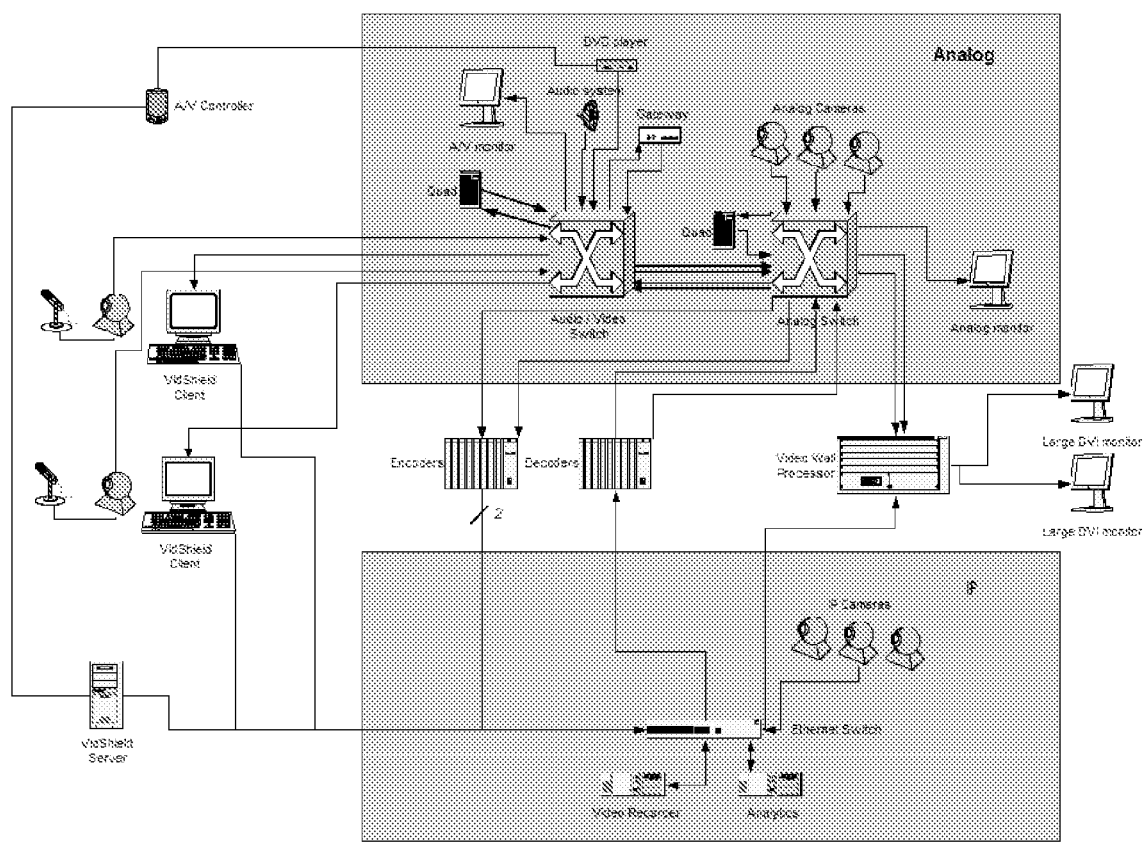
FIG. 2 illustrates an example architecture of a system on which the system of FIG. 1 may perform embodiments as disclosed herein.

FIG. 2 illustrates an example of a system 200 on which the dynamic route determining process 140-2 may operate in order to provide for transmission of video data, audio data, and control data back and forth between a variety of different devices across network resources, including devices and network resources that are incompatible with each other. The system 200 is described in greater detail below with regards to FIGS. 3-6. FIGS. 3-6 are flowcharts of various embodiments of the dynamic route determining process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
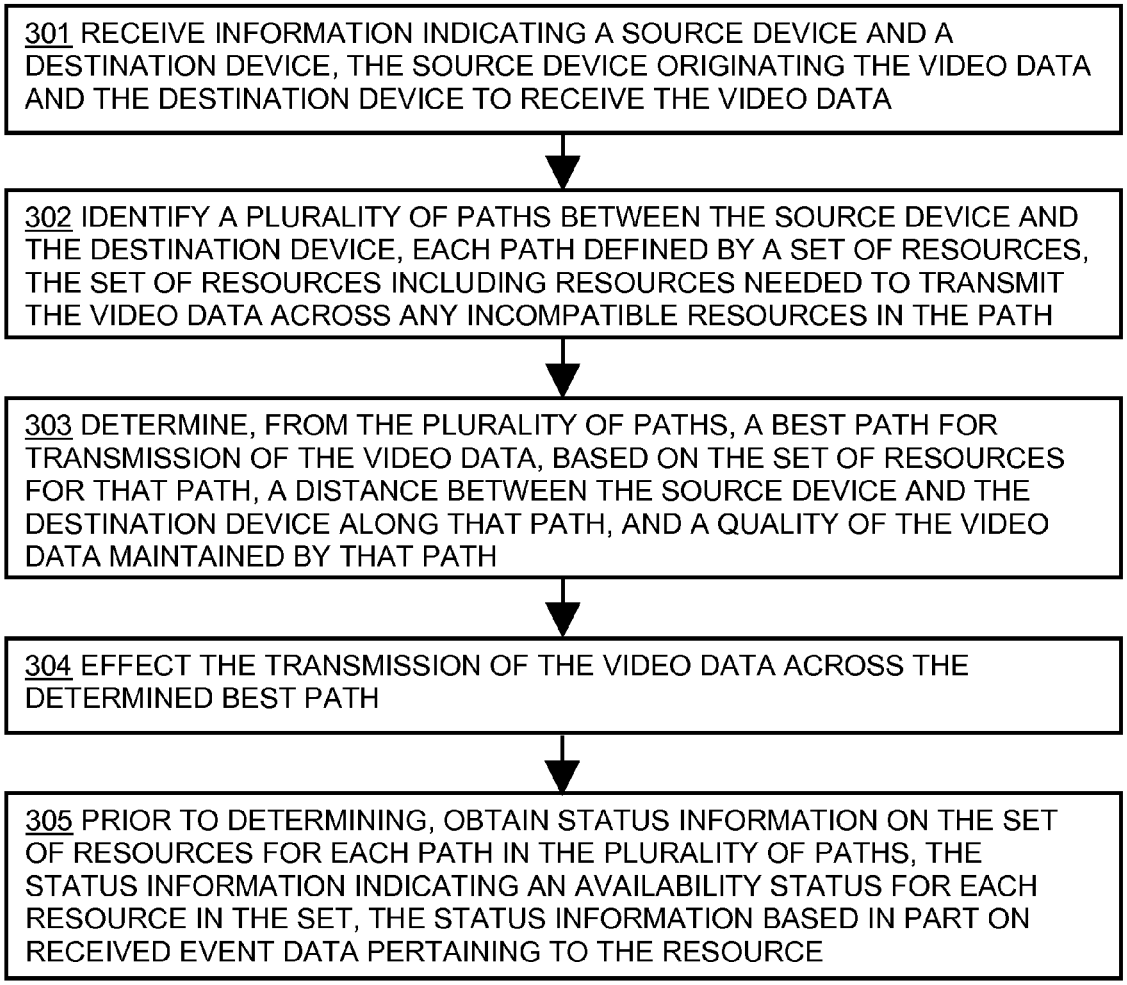
FIG. 3 illustrates a flowchart of a procedure performed by the system of FIG. 1 when effecting the transmission of video data across incompatible resources in a network.

FIG. 3 illustrates an embodiment of the dynamic route determining application 140-1, executing as the dynamic route determining process 140-2, to effect transmission of video data across a network including incompatible resources in a network as described herein. The dynamic route determining process 140-2 first receives information indicating a source device and a destination device, the source device originating the video data and the destination device to receive the video data, step 301. A source device may be any device capable of providing video. For example, in the system 200 shown in FIG. 2, source devices may include analog cameras, digital video cameras (i.e., IP cameras), video recorders, and so on. A destination device may be any device capable of receiving and displaying video. For example, in the system 200 shown in FIG. 2, destination devices may include the video wall, analog monitors, and digital monitors.

The dynamic route determining process 140-2 next identifies a plurality of paths between the source device and the destination device, step 302. Each path is defined by a set of resources that includes resources needed to transmit the video data across any incompatible resources in the path. Incompatible resources are simply resources that are not, on their own, able to directly communicate with each other. For example, a routing element that provides a digital output is not able to directly communicate with a switching element that receives only analog input. A digital-to-analog conversion device (e.g., a decoder) is needed between the two elements in order for those elements to communicate. Thus, in some embodiments, a path may include only analog resources, only digital resources, or a combination of both.

The dynamic route determining process 140-2 determines, from the plurality of paths, a best path for transmission of the video data, based on the set of resources for that path, a distance between the source device and the destination device along that path, and a quality of the video data maintained by that path, step 303. The dynamic route determining process 140-2 may, in some embodiments, balance these characteristics based on current network conditions, user requirements, and the like. For example, the dynamic route determining process 140-2 may be programmed to select paths that do not include any transformations (e.g., from analog to digital or vice versa) of the video data. In some embodiments, when the dynamic route determining process 140-2 determines a best path, the dynamic route determining process 140-2 may be thought of as keeping "score cards"—that is, keeping track of the number of hops on a path between the source and the destination (each hop being a "tick" on the "score card", while the number of resources may result in another "tick"), and keeping track of the signal degradation (loss of signal over a certain amount results in a "tick" on this "score card"). The dynamic route determining process 140-2 would then select the path that "scores" most appropriately. For example, the dynamic route determining process 140-2 may select a path that "scores" below a preset threshold on quality and minimizes the number of hops. Further, in some embodiments, the dynamic route determining process 140-2 may employ a resources check that is qualified by the amount of remaining resources. That is, even though a first path may use a lot of hops (and thus, e.g., a lot of switching hardware), that path may be an acceptable route if there are plenty of that resource (i.e., the switching hardware) available. Alternatively, the dynamic route determining process 140-2 may preferred that first path to a path that uses even one port on a critical resource, or a resource that has only a few types of that resource in the network.

In some embodiments, the dynamic route determining process 140-2 may determine a best path by selecting a path that uses the least damaging transformations to video data, that is, by using higher quality preserving codecs vs lower quality codecs. Further, in some embodiments, network resources may be able to employ multiple techniques to encode data and send it over a given path. Thus, the dynamic route determining process 140-2 may also need to "score" paths from a source device to a destination device multiple times to find the best path. For example, if an encoder supported mjpeg and mpeg, either of those codecs might meet the requirements of the destination device, but not all intermediate hops might support both codecs. The dynamic route determining process 140-2 would thus need to attempt to identify and test a variety of paths using one or both of the codecs, then score those paths and pick. In some embodiments, the destination device might require a particular codec, while in other embodiments, the destination device may not care, and the dynamic route determining process 140-2 is able to determine the codec and the path as automatically as described herein.

Finally, the dynamic route determining process 140-2 effects the transmission of the video data across the determined best path, step 304. In some embodiments, the dynamic route determining process 140-2 may make use of a stack of device drivers to connect the source device and the destination device over the determined best path. That is, the stack of drivers enables the output video data from the source device to be received, and understood (i.e., successfully processed) by the destination device.

In some embodiments, the dynamic route determining process 140-2 determines a best path from a source device that is capable of sending a unicast stream, a multicast stream, or both. In other embodiments, the dynamic route determining process 140-2 determines a best path from a source device that is capable of sending a high bandwidth stream, a low bandwidth stream, or both. In such situations, the dynamic route determining process 140-2 may take the number of viewers of a stream into account when determining the best path. Alternatively, or additionally, the dynamic route determining process 140-2 may take into account the types of viewers and/or the interactive capabilities of viewers as well. Thus, network policy decisions may effect the dynamic route determining process 140-2's determination. For example, in some situations, a user may want a high quality data feed (e.g., the video will be displayed on a large screen), and in other situations, a user may want a low quality data feed (e.g., the video will be displayed on a small window, so lower refresh rate and a lower bit rate are sufficient). Thus, the dynamic route determining process 140-2 may also make use of the viewing requirements of users of one or more destination devices.

In some embodiments, the dynamic route determining process 140-2 may take advantage of information from outside sources to determine a best path. For example, the dynamic route determining process 140-2 may use event data detected by sensors. That is, prior to determining a best path, the dynamic route determining process 140-2 obtains status information on the set of resources for each path in the plurality of paths, step 305. The status information indicates an availability status for each resource in the set, and is based in part on received event data pertaining to the resource. For example, a source device may be located in a room in a building in which there is a fire, with the fire detected by a heat sensor. The heat sensor may determine that the fire is located in a part of the room in which a network resource connected to the source device is also located. The dynamic route determining process 140-2 may use this information in identifying paths as well as determining the best path, by, for example, not making use of any paths that might include the network resource.

In FIG. 4, the dynamic route determining process 140-2 effects the transmission of both video data and audio data. That is, the dynamic route determining process 140-2 allows a source device to transmit both audio data and video data across incompatible resources in a network to a destination device over a determined best path. The dynamic route determining process 140-2 first receives information indicating a source device and a destination device, the source device originating the video data and corresponding audio data, and the destination device to receive the video data and the audio data, step 401. A source device and a destination device may be any device as described herein. In some embodiments, a source device and/or a destination device is a single device that is able to originate/receive both the audio data and the video data, for example, a video camera with a microphone, or a display device that includes built-in speakers. In other embodiments, a source device may be considered to be a combination of two or more separate devices that are linked together, such as a video camera and an external microphone, where each separate component is able to originate one type of data, but not both. Similarly, in some embodiments, a destination device may also be considered to be a combination of two or more otherwise separate devices that are linked together (e.g., a display device attached to a computer system that also includes a sound output device and an attached set of speakers).

The dynamic route determining process 140-2 then identifies a plurality of paths between the source device and the destination device, each path defined by a set of resources, the set of resources including resources needed to transmit the video data and the audio data across any incompatible resources in the path, step 402. In some embodiments, resources in a path may be capable of transmitting both the video data and the audio data (e.g., IP video data in which audio data is embedded within the packets). However, in other embodiments, the video data and the audio data may need to be split (e.g., in the analog domain, where the video data is separate from the audio data). How the dynamic route determining process 140-2 deals with such a situation is described in greater detail below with regards to step 405.

The dynamic route determining process 140-2 then determines, from the plurality of paths, a best path for transmission of the video data and the audio data, based on the set of resources for that path, a distance between the source device and the destination device along that path, and a quality of the video data and the audio data maintained by that path. As described above with regards to FIG. 3, the dynamic route determining process 140-2 may balance the characteristics of each path in the plurality to determine the "best" (i.e., most optimal path). Of course, what the dynamic route determining process 140-2 considers to be the most optimal path may change over time, and may be impacted by other data traveling on the network between other source device and other destination devices. Finally, the dynamic route determining process 140-2 effects the transmission of the video data and the audio data across the determined best path, step 404.

As described above, in some embodiments, the audio data may travel separate from the video data, even for just a single hop in the network of resources. For example, some analog switches are able to handle switching audio data, or switching video data, but not both simultaneously. If such a resource is included in a path in the plurality of paths, the dynamic route determining process 140-2 will need to account for the resources necessary to perform the split, and, if needed, a recombination at a later point. That is, the dynamic route determining process 140-2 will identifying a plurality of paths between the source device and the destination device, each path defined by a set of resources, the set of resources including resources needed to transmit the video data and the audio data across any incompatible resources in the path, wherein at least one path diverges into two branches for at least one hop in the path due to at least one resource that is not capable of transmitting both the video data and the audio data, step 405. In some embodiments, the dynamic route determining process 140-2 will determine which path in the plurality is best by taking into account hops that the audio data and the video data take together as well as the hops taken when split.

Note that, in some embodiments, the dynamic route determining process 140-2 is able to support so-called phantom devices. That is, the dynamic route determining process 140-2 is able to effect transmission of audio data and video from a source device with both types of data (e.g., a DVD player, or an audio-enabled video camera) to be displayed on a view only display device with the audio data automatically routed to a separate audio input device (e.g., a local PA system). The definition of the phantom device from the perspective of the dynamic route determining process 140-2 would cover the video data port on one device and the audio data port on another. However, from the point of view of a user watching the video data and listening to the audio data, it is a single device. Similarly, from the point of view of a routing resource, it is a single device at the API level. However, within the dynamic route determining process 140-2, the two separate destination devices (or sources in the case of a phantom source) would be used in routing calculations instead of the single phantom device.

FIG. 5 illustrates an embodiment of the dynamic route determining process 140-2 in which the dynamic route determining process 140-2 effects transmission of control data from a destination device back to a source device. The dynamic route determining process 140-2 first performs the procedure described above with regards to FIG. 3. That is, the dynamic route determining process 140-2 receives information indicating a source device and a destination device, the source device originating the video data and the destination device to receive the video data, step 501. The dynamic route determining process 140-2 next identifies a plurality of paths between the source device and the destination device, step 502. Each path is defined by a set of resources that includes resources needed to transmit the video data across any incompatible resources in the path. The dynamic route determining process 140-2 determines, from the plurality of paths, a best path for transmission of the video data, based on the set of resources for that path, a distance between the source device and the destination device along that path, and a quality of the video data maintained by that path, step 503. Finally, the dynamic route determining process 140-2 effects the transmission of the video data across the determined best path, step 504.

At this point, a clearly defined path exists between the source device and the destination device—the determined best path. While this path may remain the best path for sending video from the source to the destination, data sent from the destination to the source, such as control data, may require a different path. In such situations, the dynamic route determining process 140-2 identifies a plurality of control paths between the destination device and the source device across the network, each control path capable of carrying control data from the destination device to the source device, each control path defined by a set of resources, the set of resources including resources needed to transmit the control data across any incompatible resources in the control path, step 505. A source device and/or a destination device, in some embodiments, may be a single device capable of originating/receiving video data/audio data/control data, or may be considered to be two (or more) otherwise separate devices that are linked together (e.g., a display device connected to a computer system that includes a sound output device attached to a pair of speakers and an I/O controller attached to an input device).

The dynamic route determining process 140-2 then determines, from the plurality of control paths, a best control path for transmission of the control data, based on the set of resources for that control path, a distance between the destination device and the source device along that control path, and a quality of the control data maintained by that control path, step 506. Here, similarly to video data and audio data, the quality of the control data may be reflected by a loss of packets over digital resources in the path, a loss of signal over analog resources in the path, or both due to transformations from analog to digital or vice versa. Finally, the dynamic route determining process 140-2 effects the transmission of the control data across the determined best control path, step 507.

In some embodiments, video data may originate at a first source device but may also travel through a second source device prior to reaching the destination device. The second source device and the first source device may each require separate streams of control data. For example, a video camera may provide video data to a GUI shown on a display device. That video data may first travel through an NVR (network video recorder) for storage. The GUI is able to show current video data, from the video camera, or stored video data, from the NVR, on the display. The control data required by the NVR (e.g., to rewind, play frame-by-frame, etc.) may differ from the control data required by the video camera (e.g., zoom in, tilt to preset position four, etc.). In such situations, the dynamic route determining process 140-2 identifies a plurality of control paths by identifying a plurality of control paths between the destination device and the first and second source devices, each control path diverging at a point so as to carry control data from the destination device to the first source device and to the second source device, each control path defined by a set of resources, the set of resources including resources needed to transmit the control data across any incompatible resources in the control path, step 508. The control data required by the NVR will thus reach the NVR, while the control data required by the video camera will reach the video camera. Thus, the dynamic route determining process 140-2 supports split routing decisions in the control domain as well as in the audio domain and the video domain. Further, in some embodiments, a source device may send control data to a destination device. For example, a video camera with PTZ positioning might send data to a PTZ control device (i.e., a keyboard, mouse, joystick, or other type of input device) identifying the current PTZ position of the video camera. In such situations, the dynamic route determining process 140-2 may use the same determined best control path, or may perform the same steps as described above, but in reverse (i.e., control data from the source to the destination).

Of course, in some embodiments, the dynamic route determining process 140-2 is capable of both effecting the transmission of audio and video data from a source device to a destination device, as well as effecting the transmission of control data from a destination device to a source device. An example of such an embodiment is described in FIG. 6, which is essentially a combination of the embodiments shown in FIGS. 4 and 5. Thus, the dynamic route determining process 140-2 first receives information indicating a source device and a destination device, the source device originating the video data and corresponding audio data and to receive control data, and the destination device to receive the video data and the audio data and originating the control data, step 601. The dynamic route determining process 140-2 then identifies a plurality of paths between the source device and the destination device, the plurality of paths divided into a first group and a second group, step 602. The first group is capable of transmitting audio data, video data, or both, and each path in the first group is defined by a set of resources that includes resources needed to transmit the video data and the audio data across any incompatible resources in the path. The second group is capable of transmitting control data, and each path in the second group is defined by a set of resources including resources needed to transmit the control data across any incompatible resources in the path. In some situations, the first group and the second group may contain some overlap, that is, they may each contain some of the exact same paths. Alternatively, in some embodiments, there is complete overlap between the first group and the second group such that the first group and the second group each include the exact same paths. Further, in some embodiments, paths within the first group, the second group, or both may include one or more points of divergence and/or convergence, where data may be split and/or rejoined as necessary.

The dynamic route determining process 140-2 then determines, from the first group, a first best path for transmission of the video data and the audio data, based on the set of resources for that path, a distance between the source device and the destination device along that path, and a quality of the video data and the audio data maintained by that path, step 603. The dynamic route determining process 140-2 also determines, from the second group, a second best path for transmission of the control data, based on the set of resources for that path, a distance between the destination device and the source device along that path, and a quality of the control data maintained by that path, step 604. The dynamic route determining process 140-2 may use any of the determining techniques described herein for these steps.

Finally, the dynamic route determining process 140-2 effects the transmission of the video data and the audio data across the determined first best path, step 605, and effects the transmission of the control data across the determined second best path, step 606. Of course, the dynamic route determining process 140-2 may, in such situations, use any of the techniques described above that are particular to effecting the transmission of video data, audio data, or control data.

In some embodiments, though the dynamic route determining process 140-2 is capable of effecting the transmission of video data, audio data, and control data, the dynamic route determining process 140-2 may not need to due to either the source device or the destination device not having one or more types of the data available. That is, for example, a source device may output video data, audio data, and control data, but a destination device may only accept video data (e.g., a digital computer monitor with no speakers and no connected input device). The dynamic route determining process 140-2 would, in such situations, effect the transmission of only the video data, and not the audio data or the control data. The dynamic route determining process 140-2 could determine the types of data that a source device or a destination device is able to handle in any number of ways. For example, such data may be stored in a configuration database, and the dynamic route determining process 140-2 would simply need to query the database. Alternatively, the dynamic route determining process 140-2 may communicate directly with the device, and determine that it is not able to support, for example, audio data.

In some embodiments, the dynamic route determining process 140-2 may use hints and/or weights in determining the best path. For example, a hint associated with a network resource, or a weight assigned to a network resource, may indicate that the resource is scarce and should only be used as a last resort. Thus, a path including a codec that transforms an analog input to an mpeg4 output might be a poor choice, and hinted or weighed accordingly, if there were only a small number of those codecs and there were other similar paths that used a different codec/transformation. Further, the dynamic route determining process 140-2 might use hints to specify additional information about the topology of the network, such as but not limited to latency and bandwidth. The dynamic route determining process 140-2 might also use hints to include information about packet loss on a digital portion of a path between a source device and a destination device. The dynamic route determining process 140-2 may determine packet loss by accessing information identifying whether a path was within a site (i.e., on a local LAN) or crossed into an external WAN. The dynamic route determining process 140-2 could then measure packet loss by return ACKs/NACKs (acknowledgements/negative acknowledgements) in the transport control protocol (TCP) stream to influence codec selection (i.e., sending mpeg transport streams instead of mpeg system streams). The dynamic route determining process 140-2 might also record instances of past packet loss and use that data as well.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory (i.e., solid state memory) device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Those skilled in the art may make many additional changes in the details, materials, and arrangement of parts, herein described and illustrated.

What is claimed is:

1. A method of effecting the transmission of video data across a network of resources, the network including incompatible resources, the method comprising:
   identifying a plurality of security devices in an area to be secured, the security devices for capturing and conveying audio and video data of the area to be secured;
   receiving information from at least one of the identified security devices, the information indicating a source device and a destination device, the source device originating the audio and video data and the destination device to receive the audio and video data;
   identifying a plurality of paths between the source device and the destination device, each path defined by a set of resources, the set of resources including resources needed to transmit the video data and audio data across any incompatible resources in the path, wherein at least one path diverges into two branches for at least one hop in the path resulting from at least one resource that is not capable of transmitting both the video data and the audio data, the incompatibility requiring a transformation for transmission across the incompatible resource;
   determining, based on available video transformation and A/D (analog to digital) conversion resources for the plurality of paths, a path for transmission of the video data, based on the set of resources for that path, a distance between the source device and the destination device along that path, and a quality of the video data maintained by that path; and
   effecting the transmission of the video data across the determined path.

2. The method of claim 1 wherein the source device originates the video data and corresponding audio data, and the destination device receives the video data and the audio data;
   the set of resources including resources needed to transmit the video data and the audio data across any incompatible resources in the path;
   and wherein determining further comprises:
   determining, a quality of the video data and the audio data maintained by that path;
   and wherein effecting comprises:
   effecting the transmission of the video data and the audio data across the determined path.

3. The method of claim 1 comprising:
   identifying a plurality of control paths between the destination device and the source device across the network, each control path capable of carrying control data from the destination device to the source device, each control path defined by a set of resources, the set of resources including resources needed to transmit the control data across any incompatible resources in the control path;
   determining, from the plurality of control paths, a control path for transmission of the control data, based on the set of resources for that control path, a distance between the destination device and the source device along that control path, and a quality of the control data maintained by that control path; and
   effecting the transmission of the control data across the determined control path.

4. The method of claim 3 wherein the video data originates at a first source device and travels through a second source device to the destination device via the determined path, wherein identifying a plurality of control paths comprises:

identifying a plurality of control paths between the destination device and the first and second source devices, each control path diverging at a point so as to carry control data from the destination device to the first source device and to the second source device, each control path defined by a set of resources, the set of resources including resources needed to transmit the control data across any incompatible resources in the control path.

5. The method of claim 1 wherein receiving comprises:

receiving information indicating a source device and a destination device, the source device originating the video data and corresponding audio data and to receive control data, and the destination device to receive the video data and the audio data and originating the control data;

and wherein identifying comprises:

identifying a plurality of paths between the source device and the destination device, the plurality of paths divided into a first group and a second group, the first group capable of transmitting audio data, video data, or both, wherein each path in the first group is defined by a set of resources, the set of resources including resources needed to transmit the video data and the audio data across any incompatible resources in the path, the second group capable of transmitting control data, wherein each path in the second group is defined by a set of resources, the set of resources including resources needed to transmit the control data across any incompatible resources in the path;

and wherein determining comprises:

determining, from the first group, a first path for transmission of the video data and the audio data, based on the set of resources for that path, a distance between the source device and the destination device along that path, and a quality of the video data and the audio data maintained by that path; and determining, from the second group, a second path for transmission of the control data, based on the set of resources for that path, a distance between the destination device and the source device along that path, and a quality of the control data maintained by that path;

and wherein effecting comprises:

effecting the transmission of the video data and the audio data across the determined first path; and effecting the transmission of the control data across the determined second path.

6. The method of claim 1 comprising:

prior to determining, obtaining status information on the set of resources for each path in the plurality of paths, the status information indicating an availability status for each resource in the set, the status information based in part on received event data pertaining to the resource.

7. A computer program product, stored on non-transitory computer readable storage medium, for effecting the transmission of video data across a network of resources, the network including incompatible resources, the computer program product comprising:

computer program code for identifying a plurality of security devices in an area to be secured, the security devices for capturing and conveying audio and video data of the area to be secured;

computer program code for receiving information from at least one of the identified security devices, the information indicating a source device and a destination device, the source device originating the video data and accompanying audio data, and the destination device to receive the audio and video data;

computer program code for identifying a plurality of paths between the source device and the destination device, each path defined by a set of resources, the set of resources including resources needed to transmit the video data and audio data across any incompatible resources in the path, wherein at least one path diverges into two branches for at least one hop in the path resulting from at least one resource that is not capable of transmitting both the video data and the audio data;

computer program code for determining, based on available video transformation and A/D (analog to digital) conversion resources for the plurality of paths, a path for transmission of the video data, based on the set of resources for that path, a distance between the source device and the destination device along that path, and a quality of the video data maintained by that path; and computer program code for effecting the transmission of the video data across the determined path.

8. The computer program product of claim 7 wherein computer program code for receiving comprises:

computer program code for receiving information indicating a source device and a destination device, the source device originating the video data and corresponding audio data, and the destination device to receive the video data and the audio data;

and wherein computer program code for identifying comprises:

computer program code for identifying a plurality of paths between the source device and the destination device, each path defined by a set of resources, the set of resources including resources needed to transmit the video data and the audio data across any incompatible resources in the path;

and wherein computer program code for determining comprises:

computer program code for determining, from the plurality of paths, a path for transmission of the video data and the audio data, based on the set of resources for that path, a distance between the source device and the destination device along that path, and a quality of the video data and the audio data maintained by that path;

and wherein computer program code for effecting comprises:

computer program code for effecting the transmission of the video data and the audio data across the determined path.

9. The computer program product of claim 8 wherein computer program code for identifying comprises:

computer program code for identifying a plurality of paths between the source device and the destination device, each path defined by a set of resources, the set of resources including resources needed to transmit the video data and the audio data across any incompatible resources in the path, wherein at least one path diverges into two branches for at least one hop in the path resulting from at least one resource that is not capable of transmitting both the video data and the audio data.

10. The computer program product of claim 7 comprising:

computer program code for identifying a plurality of control paths between the destination device and the source device across the network, each control path capable of carrying control data from the destination device to the source device, each control path defined by a set of resources, the set of resources including resources needed to transmit the control data across any incompatible resources in the control path;

computer program code for determining, from the plurality of control paths, a control path for transmission of the control data, based on the set of resources for that control path, a distance between the destination device and the source device along that control path, and a quality of the control data maintained by that control path; and computer program code for effecting the transmission of the control data across the determined control path.

11. The computer program product of claim 10 wherein the video data originates at a first source device and travels through a second source device to the destination device via the determined path, wherein computer program code for identifying a plurality of control paths comprises:

computer program code for identifying a plurality of control paths between the destination device and the first and second source devices, each control path diverging at a point so as to carry control data from the destination device to the first source device and to the second source device, each control path defined by a set of resources, the set of resources including resources needed to transmit the control data across any incompatible resources in the control path.

12. The computer program product of claim 7 wherein computer program code for receiving comprises:

computer program code for receiving information indicating a source device and a destination device, the source device originating the video data and corresponding audio data and to receive control data, and the destination device to receive the video data and the audio data and originating the control data;

and wherein computer program code for identifying comprises:

computer program code for identifying a plurality of paths between the source device and the destination device, the plurality of paths divided into a first group and a second group, the first group capable of transmitting audio data, video data, or both, wherein each path in the first group is defined by a set of resources, the set of resources including resources needed to transmit the video data and the audio data across any incompatible resources in the path, the second group capable of transmitting control data, wherein each path in the second group is defined by a set of resources, the set of resources including resources needed to transmit the control data across any incompatible resources in the path;

and wherein computer program code for determining comprises:

computer program code for determining, from the first group, a first path for transmission of the video data and the audio data, based on the set of resources for that path, a distance between the source device and the destination device along that path, and a quality of the video data and the audio data maintained by that path; and computer program code for determining, from the second group, a second path for transmission of the control data, based on the set of resources for that path, a distance between the destination device and the source device along that path, and a quality of the control data maintained by that path;

and wherein computer program code for effecting comprises:

computer program code for effecting the transmission of the video data and the audio data across the determined first path; and computer program code for effecting the transmission of the control data across the determined second path.

13. The computer program product of claim 7 comprising:

prior to determining, computer program code for obtaining status information on the set of resources for each path in the plurality of paths, the status information indicating an availability status for each resource in the set, the status information based in part on received event data pertaining to the resource.

14. A computer system comprising:

a memory;

a processor;

a network interface; and an interconnection mechanism coupling the memory, the processor, and the network interface, allowing communication there between;

wherein the computer system is coupled to a network of resources through the network interface, the network including incompatible resources, and wherein the memory of the computer system is encoded with a dynamic route determination application, that when executed in the processor, provides a dynamic route determination process that effects the transmission of video data and accompanying audio data across the network of resources, by causing the computer system to perform operations of:

identifying a plurality of security devices in an area to be secured, the security devices for capturing and conveying audio and video data of the area to be secured;

receiving information from at least one of the identified security devices, the information indicating a source device and a destination device, the source device originating the audio and video data and the destination device to receive the audio and video data;

identifying a plurality of paths between the source device and the destination device, each path defined by a set of resources, the set of resources including resources needed to transmit the audio and video data across any incompatible resources in the path, wherein at least one path diverges into two branches for at least one hop in the path resulting from at least one resource that is not capable of transmitting both the video data and the audio data;

determining, based on available video transformation and A/D (analog to digital) conversion resources of for the plurality of paths, a path for transmission of the video data, based on the set of resources for that path, a distance between the source device and the destination device along that path, and a quality of the video data maintained by that path; and effecting the transmission of the video data across the determined path.

15. The computer system of claim 14 wherein receiving comprises:

receiving information indicating a source device and a destination device, the source device originating the video data and corresponding audio data, and the destination device to receive the video data and the audio data;

and wherein identifying comprises:

identifying a plurality of paths between the source device and the destination device, each path defined by a set of resources, the set of resources including resources needed to transmit the video data and the audio data across any incompatible resources in the path;

and wherein determining comprises:

determining, from the plurality of paths, a path for transmission of the video data and the audio data, based on the set of resources for that path, a distance between the source device and the destination device along that path, and a quality of the video data and the audio data maintained by that path;

and wherein effecting comprises:
effecting the transmission of the video data and the audio data across the determined path.

16. The computer system of claim 14 comprising:
identifying a plurality of control paths between the destination device and the source device across the network, each control path capable of carrying control data from the destination device to the source device, each control path defined by a set of resources, the set of resources including resources needed to transmit the control data across any incompatible resources in the control path;
determining, from the plurality of control paths, a control path for transmission of the control data, based on the set of resources for that control path, a distance between the destination device and the source device along that control path, and a quality of the control data maintained by that control path; and
effecting the transmission of the control data across the determined control path.

17. The computer system of claim 16 wherein the video data originates at a first source device and travels through a second source device to the destination device via the determined path, wherein identifying a plurality of control paths comprises:
identifying a plurality of control paths between the destination device and the first and second source devices, each control path diverging at a point so as to carry control data from the destination device to the first source device and to the second source device, each control path defined by a set of resources, the set of resources including resources needed to transmit the control data across any incompatible resources in the control path.

18. The computer system of claim 14 wherein receiving comprises:
receiving information indicating a source device and a destination device, the source device originating the video data and corresponding audio data and to receive control data, and the destination device to receive the video data and the audio data and originating the control data;

and wherein identifying comprises:
identifying a plurality of paths between the source device and the destination device, the plurality of paths divided into a first group and a second group, the first group capable of transmitting audio data, video data, or both, wherein each path in the first group is defined by a set of resources, the set of resources including resources needed to transmit the video data and the audio data across any incompatible resources in the path, the second group capable of transmitting control data, wherein each path in the second group is defined by a set of resources, the set of resources including resources needed to transmit the control data across any incompatible resources in the path;

and wherein determining comprises:
determining, from the first group, a first path for transmission of the video data and the audio data, based on the set of resources for that path, a distance between the source device and the destination device along that path, and a quality of the video data and the audio data maintained by that path; and
determining, from the second group, a second path for transmission of the control data, based on the set of resources for that path, a distance between the destination device and the source device along that path, and a quality of the control data maintained by that path;

and wherein effecting comprises:
effecting the transmission of the video data and the audio data across the determined first path; and
effecting the transmission of the control data across the determined second path.

19. The computer system of claim 14 comprising:
prior to determining, obtaining status information on the set of resources for each path in the plurality of paths, the status information indicating an availability status for each resource in the set, the status information based in part on received event data pertaining to the resource.

20. The method of claim 1 wherein the network is for transporting security-related data, further comprising:
identifying a source device capable of video origination; and
identifying a destination device capable of receiving and displaying video.

21. The method of claim 20 wherein the security-related data is gathered from security resources deployed around an area to be secured, the security related data gathered in real-time from video cameras operative for direct feedback from the area to be secured.

22. The method of claim 1 wherein the incompatible resources are resources that are physically connected yet unable to directly communicate with each other.

23. The method of claim 1 wherein the incompatible resources are unable to communicate because of an analog/digital conversion.

24. The method of claim 1 wherein the incompatible resources are unable to communicate because of corresponding codecs for interpreting video data are unavailable.

25. The method of claim 1, wherein the incompatibility is resolvable by at least one of corresponding codecs or an A/D (analog to digital) conversion.

26. The method of claim 1, wherein the incompatibility is resolvable by modifying resolution of the video data.

27. The method of claim 1, wherein the incompatibility is defined by a physical connectivity existing between the source and destination nodes but an unavailability of data at the destination node results in the incompatibility.

* * * * *